(12) United States Patent
DeWaard

(10) Patent No.: US 6,997,135 B1
(45) Date of Patent: Feb. 14, 2006

(54) VALVE FOR A MILKING APPARATUS

(76) Inventor: Dave DeWaard, 8540 Benson, Lynden, WA (US) 98264

(*) Notice: Subject to any disclaimer, the term of this patent is extended or adjusted under 35 U.S.C. 154(b) by 0 days.

(21) Appl. No.: 10/682,059

(22) Filed: Oct. 8, 2003

(51) Int. Cl.
*A01J 7/00* (2006.01)
(52) U.S. Cl. ................ 119/14.44; 119/14.08; 251/329; 137/240
(58) Field of Classification Search ........... 119/14.44, 119/670–671, 14.08, 14.18; 137/239–241; 251/326–329
See application file for complete search history.

(56) References Cited

U.S. PATENT DOCUMENTS

| | | | | |
|---|---|---|---|---|
| 4,175,514 A | * | 11/1979 | Souza et al. | 119/14.08 |
| 5,492,090 A | * | 2/1996 | Bucker | 119/14.01 |
| 5,850,845 A | * | 12/1998 | Pereira et al. | 137/239 |

OTHER PUBLICATIONS

Advertisement: "Back-Flush Slide Valve" Internet catalogue, Jun. 18, 2004, 2 pages Publisher: Ross-Holm Inc. Petaluma, CA.
Author: Westfalia; Title: "West Coast Style Backflush Valve" Catalogue, rev. Apr. 1998, 1 page Publisher: WESTFALIA, USA.

* cited by examiner

*Primary Examiner*—Teri Pham Luu
*Assistant Examiner*—Kimberly S. Smith
(74) *Attorney, Agent, or Firm*—Michael F. Hughes; Hughes Law Firm, PLLC

(57) ABSTRACT

A valve assembly adapted to be used in a milking operation where the valve assembly comprises an actuator portion and a valve portion where the valve portion has a milking position and a cleaning position where when in a milking position a transverse slot located between a cleaning fluid passage and a first milking passage provides a fluid short circuit so in the event of a leak the cleaning fluid passage and the first milking passage will not communicate with one another.

35 Claims, 6 Drawing Sheets

US 6,997,135 B1

VALVE FOR A MILKING APPARATUS

BACKGROUND OF THE INVENTION

The invention relates to a milk valve switch adapted to supply udder-cleaning fluid to the claw of an automated milking apparatus and not allow the cleaning fluid to be in communication with the milk supply.

In general, after a milking operation is conducted on a cow, the teats on the udder of the cow must be cleaned. A preferred form of cleaning the teats of a cow is to backwash from a cleaning fluid supply to the claw that is attached to the cow's udder.

DETAILED DESCRIPTION OF THE PREFERRED EMBODIMENTS

Figure 1:
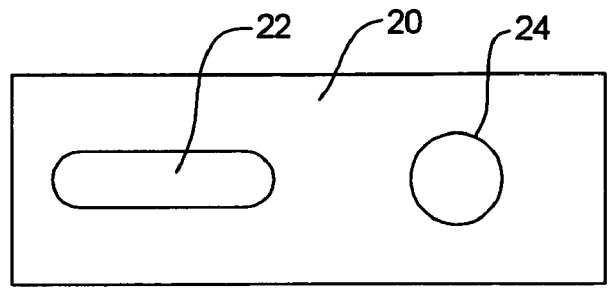
FIG. 1 shows a front view of a prior art valve element that is adapted to be mounted to a prior art valve assembly.
Figure 2:
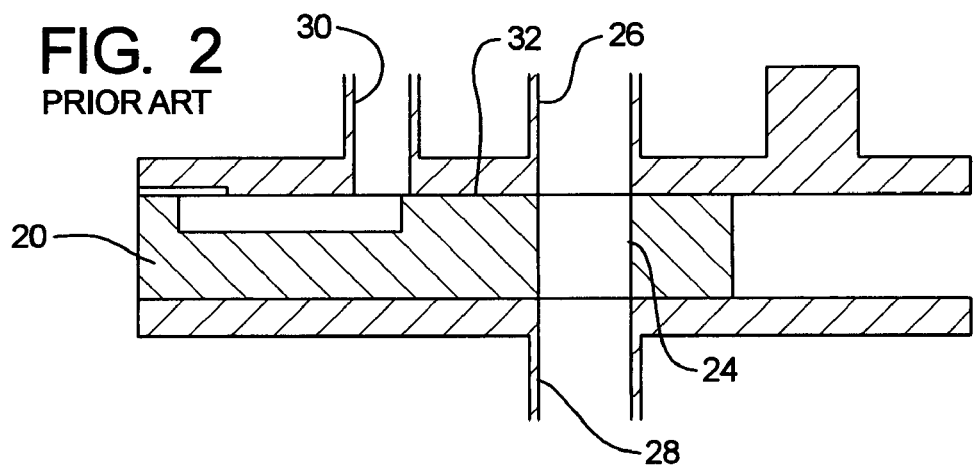
FIG. 2 is a side cross sectional view of a prior art valve assembly in a milking position.
Figure 3:
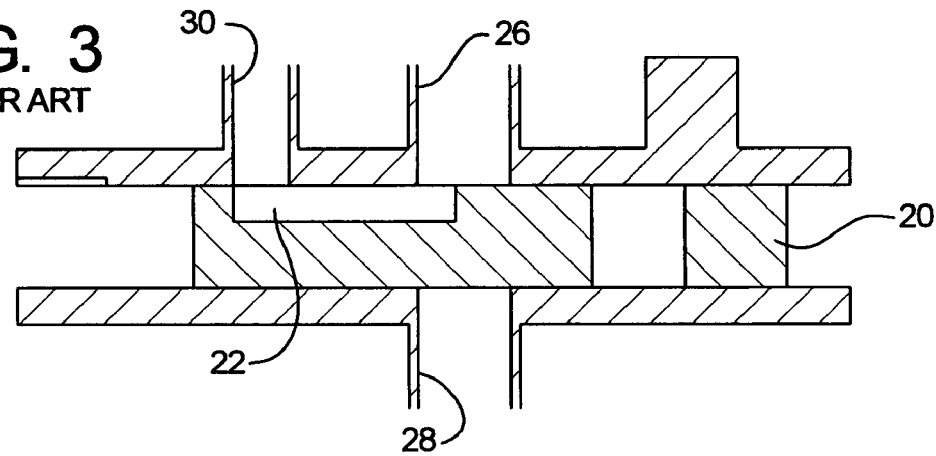
FIG. 3 is a cross sectional side view of a prior art valve assembly in a cleaning position.

As shown in FIGS. 1–6 there are various prior art valve assemblies and components thereof for a milking system. The prior art milking valve system as shown in FIGS. 1–3 are adapted to provide communication between the milking claw and the low-pressure milk supply. Secondly, the prior art system is adapted to provide communication between a cleaning fluid supply and the cow udder system. As shown in FIG. 1, the member 20 comprises a channel 22 and a channel 24. As shown in FIG. 2, the channel 24 provides communication between the passage 26 and the passage 28. The passage 26 is in communication with the milking claw and the passage 28 is in communication with the low-pressure milk supply. Now as shown in FIG. 3, the member 20 is repositioned to a different location and the passage 26 is in communication with the passage 30. The passage 30 is in communication with the cleaning fluid supply and the channel 22 is positioned in a manner to provide communication between the passages 26 and 30. Further, the passage 28 is not in direct communication with passage 26 or 30 when the prior art valve is operating properly. Now referring back to FIG. 2, in the event where a leak occurs in the least resistant fluid leakage area 32, the passage 26 may draw cleaning fluid from the passage 30 whereby contaminating the milk supply.

Figure 4:
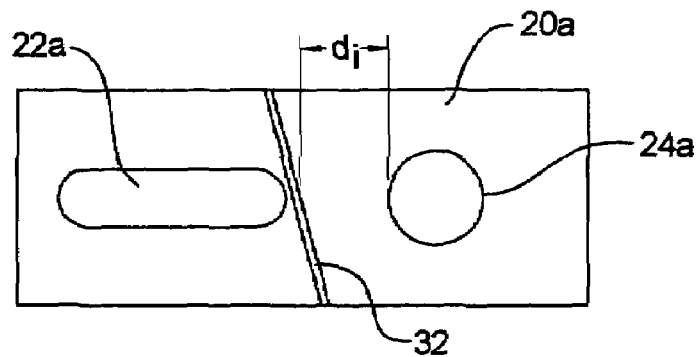
FIG. 4 shows a front view of a second prior art valve element having an oblique extending slot positioned between the cleaning fluid channel and the milk channel.
Figure 5:
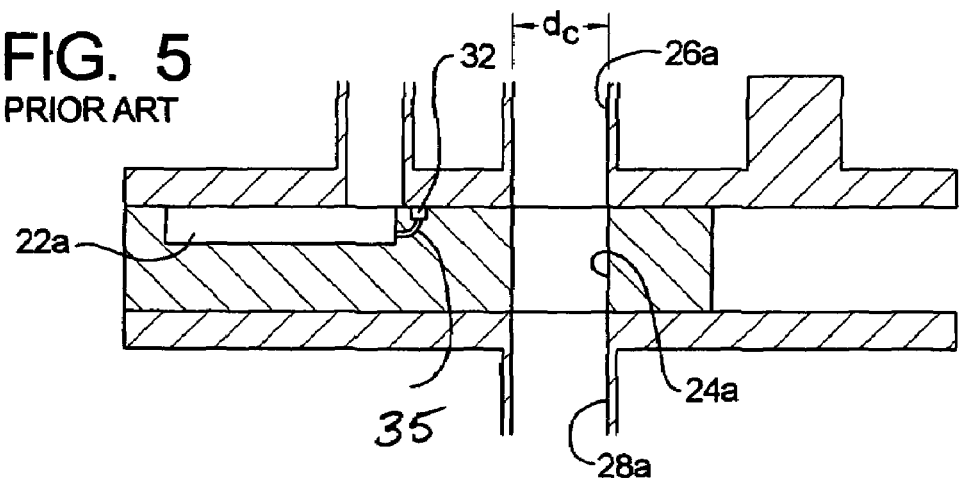
FIG. 5 is a cross sectional side view of a second prior art valve assembly in a milking position.
Figure 6:
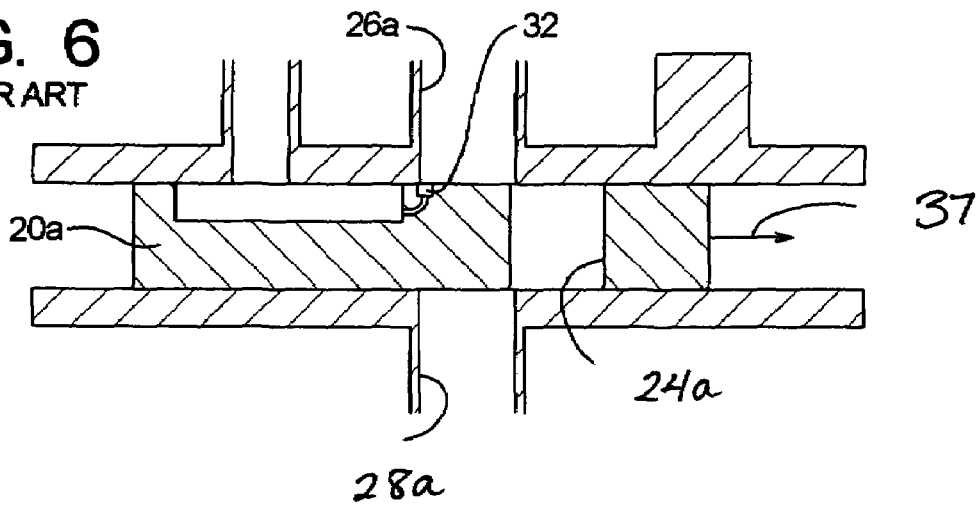
FIG. 6 shows a side cross sectional view of the second prior art valve assembly in a cleaning position.

Referring to FIGS. 4–6 there is shown a second prior art embodiment for the member 20a comprising of a passage 22a and 24a. The member 20a further comprises a channel 32. The approximate distance between the channel 24a and the channel 32 is indicated by the distance $d_i$. As shown in FIG. 5, the passage 26a is in communication with the passage 28a by virtue of the position of the member 20a and the location of the channel 24a. The diameter of the channel 26a is indicated by the distance $d_c$. FIG. 5 further illustrates in the cross sectional view that the channel 32 is in communication with the channel 22a by the internal conduit 35.

Now referring to FIG. 6, as the member is repositioned in the longitudinal direction indicated by arrow 37, the channel 32 is in communication with the channel 26a. Further, because $d_i$ is not greater than $d_c$, the channel 26a is further in communication with the channel 28a by virtue of the close proximity of channel 24a.

Figure 7:
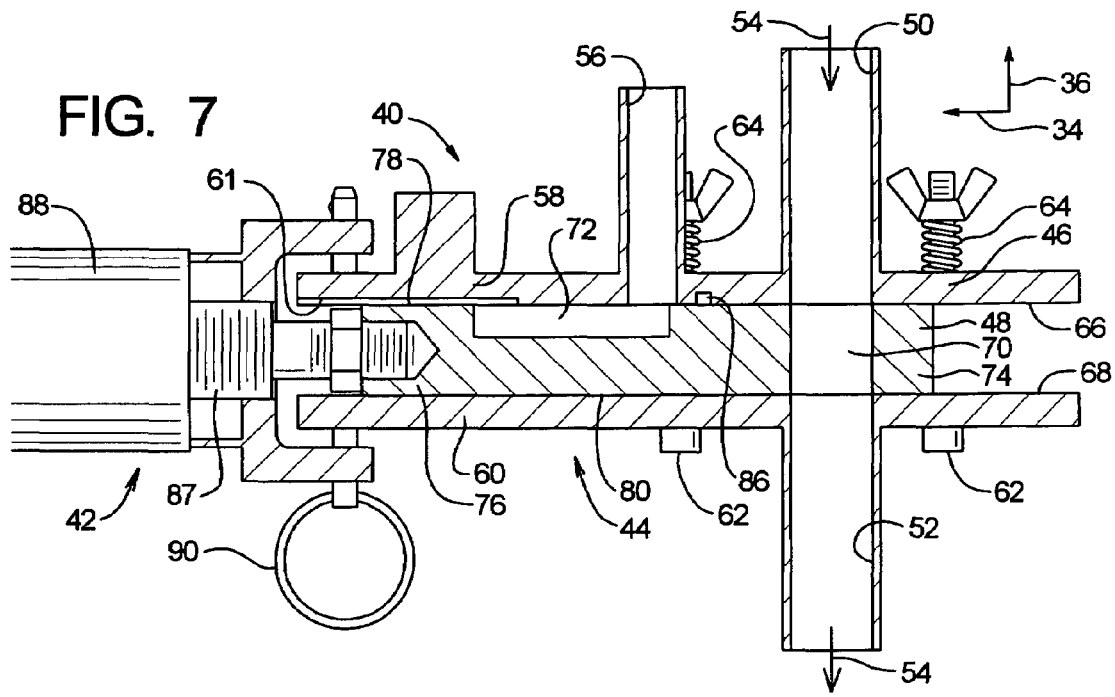
FIG. 7 shows a partial cross sectional view of an embodiment of the invention in a milking position where the valve system is cross-sectionally shown.
Figure 8:
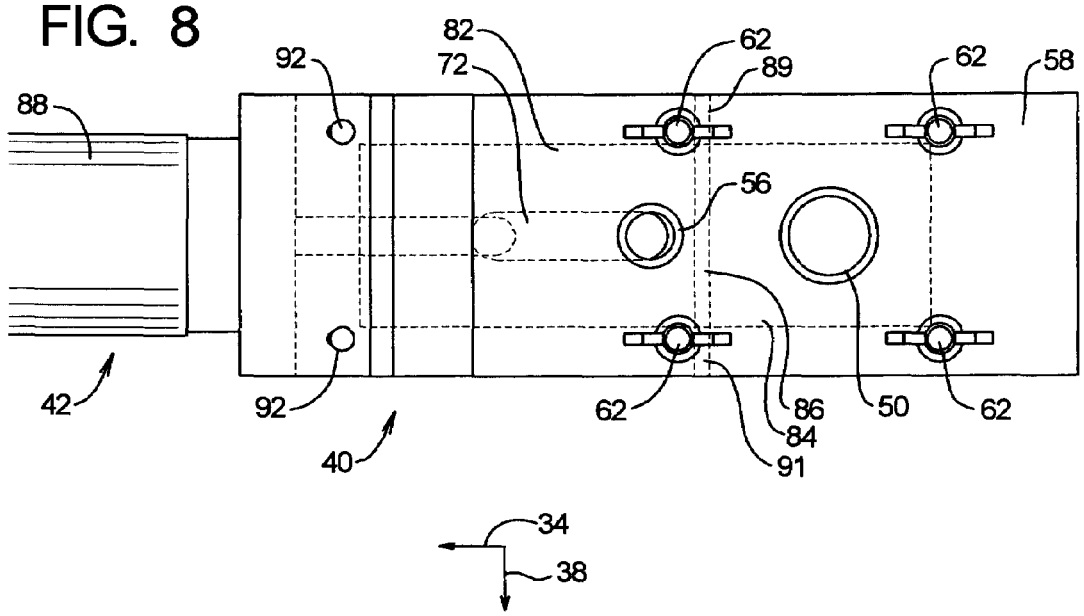
FIG. 8 shows a top view of the valve section.

FIGS. 7–16 show preferred embodiments of the present invention. As seen in FIG. 7, the valve assembly 40 comprises an actuator portion 42 and a valve section 44. To aid the description, an axis system is defined as shown in FIGS. 7 and 8. Where as shown in FIG. 7, the arrow 34 indicates a longitudinal direction. The arrow 36 indicates a transverse direction. Now referring to FIG. 8, the arrow 38 indicates a lateral direction. The axis system is intended to provide general directions and is in no way intended to limit the invention to a specific spatial orientation, but rather is intended to aid the description and where specifically claimed, the position of the components.

The valve section 44 comprises a housing section 46 and a valve element 48. The housing section 46 comprises a first milk passage 50 and a second milk passage 52. The first milk passage is in communication with a milking claw that is adapted to be mounted to the teats of a cow to extract milk therefrom. The second milk passage is adapted to be in communication with a milk supply that is under low-pressure to draw milk in the direction indicated by arrow 54. The housing section further comprises a cleaning fluid passage 56 that is adapted to be in communication with a cleaning fluid supply. The cleaning fluid supply is necessary for cleaning the teats of a cow after a milking operation.

In one form, the housing section 46 is formed by two plate-like members 58 and 60. A safety relief 61 is employed to provide communication between atmospheric pressure and the cleaning fluid channel 72, which is in communication with the cleaning fluid passage 56 when the valve element is in a milking position which is described below. The plate-like members 50 and 60 are connected by a connecting system which comprises the fasteners 62. As shown in FIGS. 7 and 8, the fasteners 62 in one form are wing nuts that can be easily assembled and removed without the use of tools. Further, springs interposed between the wing nuts and the plate members provide a variable amount of compression between the plate members 50 and 60 that can be more easily adjusted by the individual assembly the housing 46. In other words, the relatively low spring constant of a spiracle spring 64, compared to a solid material, allows for a lower differential of compression 40 given differential distance. Therefore, the assembler has a great amount of control of the amount of compression applied between the two plate's 50 and 60 by employing the interposed spring 64. Of course other forms of springs can be employed. The plate-like members 50 and 60 each comprises an inner surface (inner transverse surface) 66 and 68.

The valve element 48 comprises a milk channel 70 and the cleaning fluid channel 72. The valve element 48 further comprises a first longitudinal end 74 and a second longitudinal end 76. With respect to the transverse axis 36, the valve element 48 has a first transverse side 78 and a second transverse side 80. As shown in FIG. 8, the hatched lines indicate the valve element 48 which further comprises a first lateral section 82 and a second lateral section 84.

The valve section 44 comprises a relief slot 86 that as shown in FIGS. 7 and 8 in one form is defined by the housing section 46. The relief slot 86 is positioned between a least resistant fluid leakage area which is located between the cleaning fluid passage 56 and the first milk passage 50. The least resistant fluid leakage area is defined as an area where low fluid resistance may occur between the first milking passage 50 and the cleaning fluid passage 56. During operation wear may occur on either the housing section 46 or the valve element 48 whereby longitudinally extending grooves may form. The operation of the relief slot 86 is to provide a low fluid resistance conduit to an alternative location other than either the first milk passage 50 or the cleaning fluid passage 56. As shown in FIG. 8, in one form the relief slot 86 has lateral hands 89 and 91 which extend the lateral direction beyond the lateral width of the valve element 48. In this form, the relief slot 86 provides communication with atmospheric surroundings whereby the low-pressure in the milk conduit (defined below) will draw from an alternative source (the atmosphere) other than taking fluid from the cleaning fluid passage 56 or the cleaning fluid channel 72 which would contaminate the milk supply.

The actuator portion 42 comprises an actuating member 87 that is connected to the valve element 48. In one form, the actuating member 87 is connected to the second longitudinal end 76 of the valve element 48. The actuator portion 42 further comprises a housing portion 88 that is connected to the housing section 46 by a connecting system 90. In one form, the connecting system 90 comprises members 92. In one form the connecting members 92 are pin like structures that extend substantially in the transverse direction and extend through holes in the housing portion 88 and housing section 46 that are concentric and substantially aligned in the transverse direction. By employing pins and in one-form quick release pins for the connecting system 90, the housing section 46 can be easily disassembled/reassembled for inspection and cleaning. By using pins no tools are required for disassembly and it can be executed with the operator wearing hand protection.

There will now be a discussion of the operation of the valve assembly with reference to FIGS. 7–10. FIGS. 7 and 8 showed the valve assembly in a milking position where the milk channel 70 of the valve element 48 is arranged in a manner so the first milk passage 50 is in communication with the second milk passage 52. The first milk passage 50, the milk channel 70 and the second milk passage 52 collectively are referred to as a milk conduit when the valve assembly is in a milking position. In normal operation, the pressure supplied to the cleaning fluid passage 56 is not activated. If the control system, whether automated or executed manually, inadvertently supply's pressure to the cleaning fluid passage 56 when the valve assembly is a milking position, the cleaning fluid will be directed through the cleaning fluid channel 72 to the safety relief 61. The safety relief 61 helps prevent the cleaning fluid from pressurizing the area between the plate-like members 58 and 60 which may contaminate the milk supply conduit.

As partially described above, the relief slot 86 is positioned along a least resistant fluid leakage area. As previously described, the least resistant fluid leakage area is generally defined as an area where potential fluid leakage path may occur between the milk conduit and the area a housing cleaning fluid when the valve assembly is in a milking position. Because the valve element 48 reciprocates in the longitudinal direction it is possible that least resistant fluid leakage paths may occur whereby friction wear creates such paths in either the housing section 46 or the valve element 48. The relief slot 86 provides a short circuit along the least resistant fluid leakage area whereby low-pressure within the milk conduit will draw air down the relief slot 86 in the event any least resistant fluid leakage path is formed in the defined least resistant fluid leakage area. As shown in FIG. 8, the lateral portions 89 and 91 of the relief slot extend beyond the lateral width of the valve element 48. As described below, the second embodiment illustrates how the relief slot 86 can alternatively be formed to accomplish the desired results.

Figure 9:
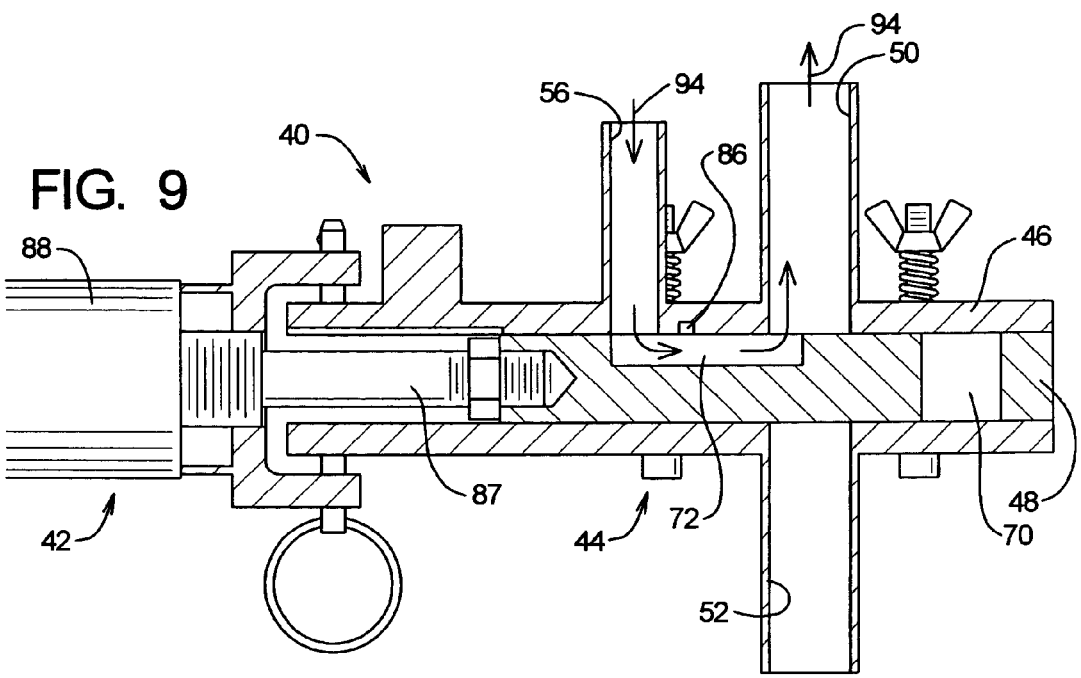
FIG. 9 shows a partial cross sectional view of an embodiment of the present invention in a cleaning phase where the valve section is cross-sectionally shown.
Figure 10:
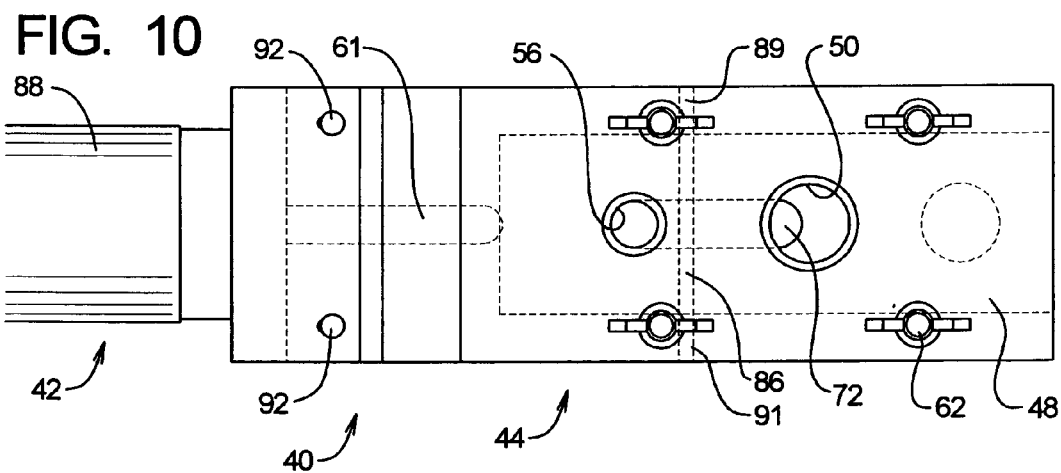
FIG. 10 shows a top view of an embodiment of the present invention in the milking phase where the valve element is shown as they hatched hidden line and the fluid channel is in communication with both the cleaning fluid passage and a milk passage.

Now referring to FIGS. 9 and 10, the valve assembly 40 is in a cleaning position whereby the valve element is positioned in a manner so the cleaning channel provides communication between the cleaning fluid passage 56 and the first milking passage 50. The cleaning fluid is further in communication with the relief slot 86. Therefore, in operation when the valve assembly 40 is in a cleaning position the relief slot 86 is flush with cleaning fluid whereby it is maintained free of debris. In one of the cleaning positions, the cleaning fluid source (not shown) is pressurized or an additional valve is opened whereby cleaning fluid under pressure either by a pump or through gravitational hydrostatic pressure, flows as indicated by arrows 94 and the cleaning fluid backwash is the claw which is attached to the teats of the cow (not shown). The milk channel 70 is cut off from communication from either the first milk passage 50 or the second milk passage 52. In one form, the valve assembly 40 is switched from a milking position to the cleaning position by extending the actuating member 87.

The primary operation of the actuator portion 42 is to switch the valve section 44 between the milking position (FIGS. 7 and 8) and the cleaning position (FIGS. 9 and 10). In one form, the actuator portion 42 is a pneumatic dual thrust piston where pressurized air is subjected to internal cavities on either side of a piston member (not shown). Of course this is one embodiment and various other methods of biasing the valve section 44 from the cleaning position to a milking position can be accomplished without departing from the scope of the invention. For example, a single thrust actuator can be employed where an opposing spring is attached to the reciprocating motion portion and a housing portion whereby when the actuator is no longer pressurized or imparting a force the spring expands to an alternative position. Of course various other methods can be employed without departing from the scope of the invention such as a revolving mechanism whereby a relief slot is provided between the cleaning fluid passage and the first milk passage instead of a reciprocating valve element 48.

Now referring to FIGS. 11–16, a second embodiment is presented where similar numerals are maintained for similar components.

Figure 11:
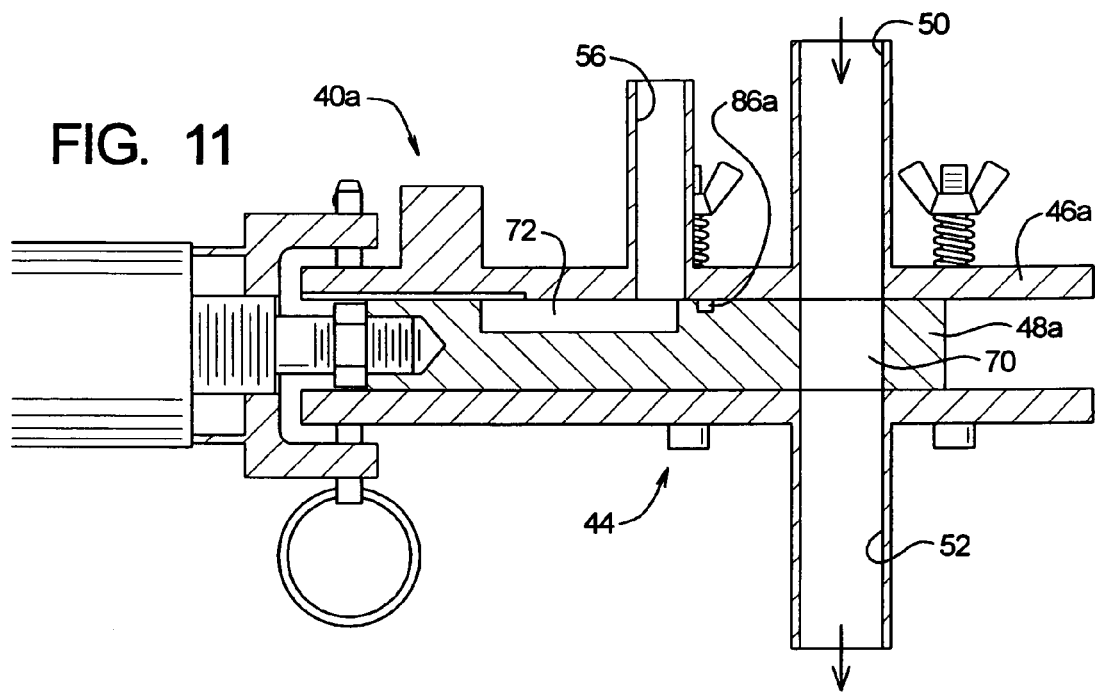
FIG. 11 shows a partial cross sectional side view of the valve assembly in the milking phase of another embodiment of the present invention.
Figure 12:
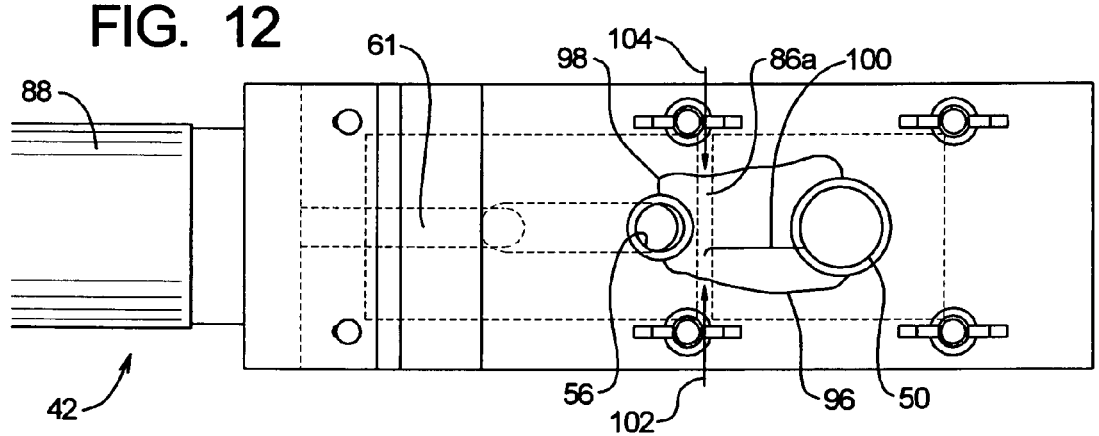
FIG. 12 is a is a top view of another embodiment of the present invention in the milking phase.

FIGS. 11 and 12 show the valve assembly 40a in a cleaning position where the housing section 46a comprises a first milk passage 50, a second milk passage 52 and a cleaning fluid passage 56. The valve element 48a comprises the milk channel 70 and a cleaning fluid channel 72.

The valve section 44 comprises the relief slot 86a. The relief slot 86a is formed on the valve element 48a as shown in FIG. 11. As previously mentioned, the relief slot is to provide a fluid short circuit between the milk conduit and the cleaning fluid conduit 56 (as well as the cleaning fluid channel when in the milking position). Therefore, as shown in FIG. 11 the relief slot 86a can be formed on the valve element 48a whereby the relief slot is still serving its intended purpose.

As shown in FIG. 12, the relief slot 86a is positioned between the cleaning fluid passage 56 and the first milk passage 50. Today the description, the general area that is roughly indicated between the lines 96 and 98 is an example of a general location where the least resistant fluid leakage area can be located. It is clear from this top view that if the least resistant fluid leakage paths such as shown by 100 would occur between lines 98 and 96 providing communication between the cleaning fluid passage 56 and the first milk passage 50, the relief slot 86a would short circuit such a path and air would be drawn from the lateral portions of the relief slot 86a as indicated by arrows 102 and 104. The atmospheric air would then be drawn through the exemplary least resistant fluids past 100. The preferred of providing a short circuit is to vent to atmospheric air; however, the relief slot could communicate to other contained locations or other mediums as long as the milk supply is not contaminated with cleaning fluid.

Figure 13:
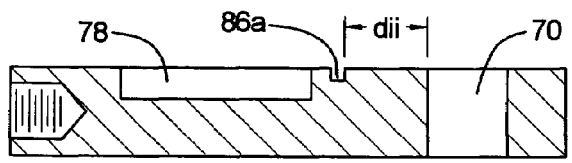
FIG. 13 is a side cross sectional view of a centerpiece of the second embodiment.
Figure 14:
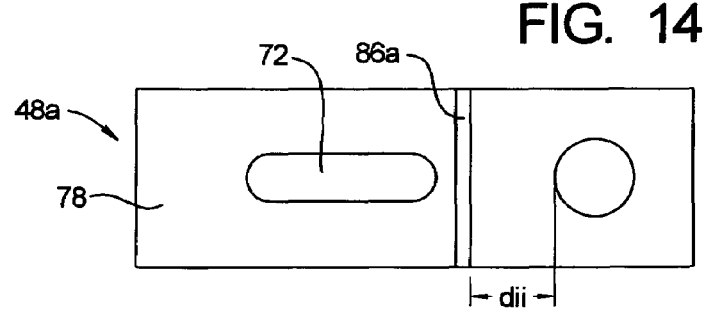
FIG. 14 is a top view of the centerpiece of the second embodiment.

FIGS. 13 and 14 shows a valve element 48a where FIG. 13 is a cross sectional view. The longitudinal distance between the milk channel 70 and the relief slot 86a is defined as $d_{ii}$. Now referring to FIG. 15, the diameter of the first milk passage 50 (or the longitudinal widths of the first milk passage 50 if it is not cylindrical) is defined as $d_{cc}$. To prevent cross contamination $d_{ii}$ is to be greater than $d_{cc}$. Further, because the relief slot 86a is not in communication with the milk channel 70 as the valve element 48a is repositioning to the cleaning position, this further prevents the chances of cross contamination.

Figure 15:
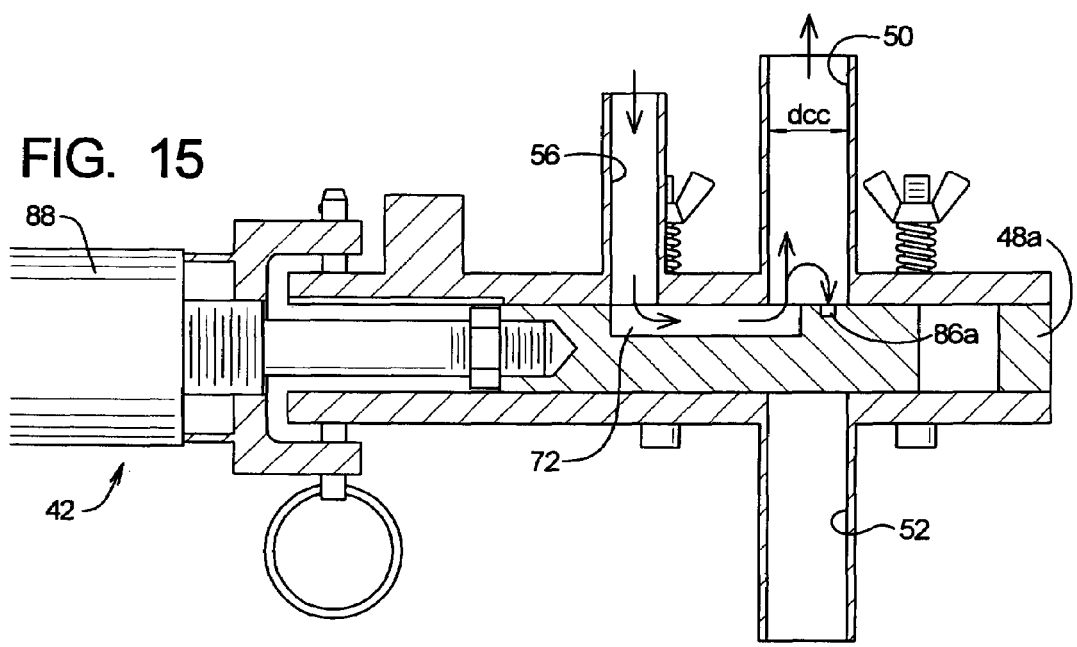
FIG. 15 is a partial sectional view of the valve section of the second embodiment in a cleaning phase.

As shown in FIG. 15, the valve assembly is in a cleaning position whereby the cleaning fluid passage 56 the first milk passage 50 and the cleaning fluid channel 72 are in communication. Further, the relief slot 86a using communication with the cleaning fluid as where shown in FIG. 16, the lateral portions in 89a and 91a of the relief slot 86a are exposed to atmospheric. It should be noted that the fluid circuit between the first milk passage, the relief slot, the cleaning fluid channel and the cleaning fluid passage have a similar fluid circuit in FIG. 10 and in FIG. 16.

Figure 16:
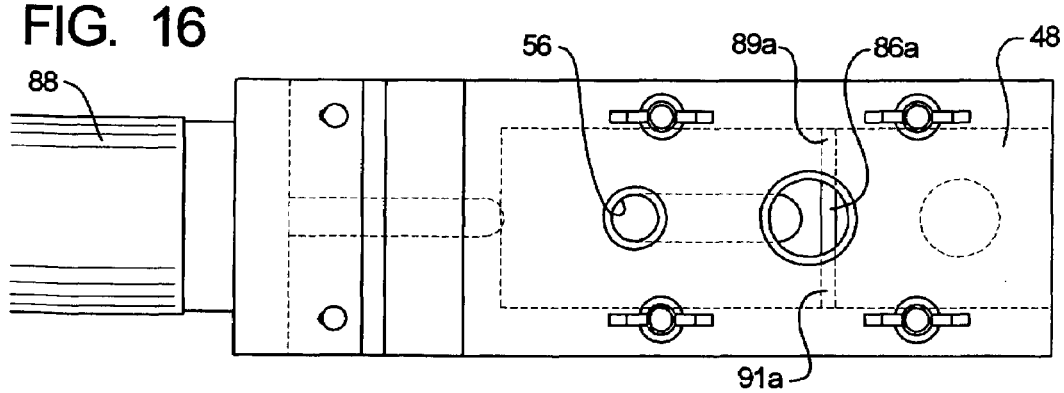
FIG. 16 is a top view of the second embodiment in a cleaning phase where the valve element is shown by hidden hatched lines, the cleaning passage is in communication with the milk passage and the laterally extending relief slot is in communication with the milk passage.

The actuator portion 42 operates in the same manner as in the first embodiment to reciprocate the valve element 48a between the milking position (FIG. 12) and the cleaning position (FIG. 16).

With the foregoing in mind, an apparatus and method has been presented for carrying out the invention as set out in the claims below. The foregoing embodiments are shown by ways of an example for carrying out the invention which is defined by the claims and the invention is to be interpreted in the broadest manner as laid out in the claims. The foregoing embodiments are illustrated to aid the reader for carrying out the best mode of operation that is known in filing the application; however, particular attention should be directed to the claims for interpreting the invention in the broadest light.

I claim:

1. A valve assembly in fluid communication between a milking claw and a milk supply, said valve assembly having a longitudinal axis and a transverse axis and said valve assembly comprising:
   a) a valve section having a relief slot, the valve section comprising a housing section having a first milk passage, a second milk passage and a cleaning fluid passage, the valve section further comprising a valve element comprising a first transverse side, a milk channel and a cleaning fluid channel, wherein the longitudinal distance between the relief slot and the milk channel is defined as $d_{ii}$ and the longitudinal distance of the first milk conduit is defined as $d_{cc}$, where $d_{ii}$ is a greater than $d_{cc}$;
   b) an actuator portion arranged to reciprocate the valve element between a milking position and a cleaning position;
   c) said valve assembly being arranged so that:
      i) when the valve assembly is in the milking position, the milk channel of the valve element is in communication between the first milk passage and the second milk passage, the relief slot is positioned between a least-resistant fluid leakage area located between the first milk passage and the cleaning fluid passage and wherein the relief slot is not in direct communication with either the cleaning fluid passage or the milking passage and
      ii) when the valve assembly is in the cleaning position, the valve element is positioned in a manner such that the cleaning channel provides communication between the cleaning fluid passage, the first milking passage and the relief slot, such that when the valve element is in transition from the milking position to the cleaning position, there is no fluid path between the cleaning fluid passage and the second milk passage.

2. The valve assembly as recited in claim 1 where the cleaning fluid passage is positioned between the actuator portion and the first milk passage.

3. The valve assembly as recited in claim 2 where the mass of the actuator is adapted to maintain the first milk passage in a position vertically above the cleaning passage.

4. The valve assembly as recited in claim 1 where the relief slot comprises lateral end portions that are in communication to the surrounding atmosphere.

5. The valve assembly as recited in claim 1 where the relief slot is located on the housing section.

6. The valve assembly as recited in claim 1 where the relief slot is located on the valve element.

7. The valve assembly as recited in claim 1 where the first milk passage and the second milk passage are located on opposite sides of the valve element substantially aligned along the transverse axis.

8. The valve assembly as recited in claim 1 where when the valve assembly is in the cleaning position, cleaning fluid passes laterally through the relief slot and exits to the surrounding atmosphere.

9. The valve assembly as recited in claim 8 where the relief slot is located on the housing section.

10. The valve assembly as recited in claim 8 where the relief slot is located on the valve element.

11. The valve assembly as recited in claim 1 where said housing section comprises a housing which defines the first milk passage, the second milk passage and the cleaning fluid passage.

12. The valve assembly as recited in claim 11 where the housing section is comprised of two plate-like members where one plate-like member forms the first milking passage and the other plate-like member forms the second milking passage.

13. The valve assembly as recited in claim 12 where the valve element is interposed between the two plate-like members and the plate-like members are connected by fastening members to provide quick disassembly.

14. The valve assembly as recited in claim 13 where the housing can be disassembled by hand without the use of tools.

15. The valve assembly as recited in claim 12 where the valve element is adapted to reciprocate in the longitudinal direction from the milking position to the cleaning position.

16. The valve assembly as recited in claim 12 where said actuator comprises a housing portion that is attached to the housing of the valve portion by quick release pins.

17. A valve assembly in fluid communication between a milking claw and a milk supply, said valve assembly having a longitudinal axis and said valve assembly comprising:
   a) a valve section having a relief slot, the valve section comprising a housing section having a first milk passage, a second milk passage and a cleaning fluid passage, the valve section further comprising a valve element comprising a first transverse side, a milk channel and a cleaning fluid channel, wherein the longitudinal distance between the relief slot and the milk channel is defined as $d_{ii}$ and the longitudinal distance of the first milk conduit is defined as $d_{cc}$, where $d_{ii}$ is a greater than $d_{cc}$;
   b) an actuator portion arranged to position the valve element in a milking position, wherein the milk channel of the valve element is in communication between the first milk passage and the second milk passage and the relief slot is positioned between a least-resistant fluid leakage area located between the first milk passage and the cleaning fluid passage and wherein the relief slot is not in direct communication with either the cleaning fluid passage or the milk passage; and the actuator portion is further arranged to position the valve element to a cleaning position so that the cleaning channel provides communication between the cleaning fluid passage, the first milking passage and the relief slot, such that the relief slot is flushed with cleaning fluid and wherein when the valve element is in transition from the milking position to the cleaning position, there is no fluid path between the cleaning fluid passage and the second milk passage.

18. The valve assembly as recited in claim 17 where the cleaning fluid passage is positioned between the actuator portion and the first milk passage.

19. The valve assembly as recited in claim 18 where the mass of the actuator is adapted to maintain the first milk passage in a position above the cleaning passage.

20. The valve assembly as recited in claim 17 where the relief slot is located on the housing section.

21. The valve assembly as recited in claim 17 where the relief slot is located on the valve element.

22. The valve assembly as recited in claim 19 where when the valve assembly is in the cleaning position, cleaning fluid passes through the relief slot and exits the surrounding atmosphere.

23. The valve assembly as recited in claim 17 where said housing section comprises a housing which defines the first milk passage, the second milk passage and the cleaning fluid passage.

24. The valve assembly as recited in claim 23 where the housing section is comprised of two plate-like members where one plate-like member forms the first milking passage and the other plate-like member forms the second milking passage.

25. The valve assembly as recited in claim 24 where the valve element is interposed between the two plate-like members and the plate-like members are connected by fastening members to provide quick disassembly.

26. The valve assembly as recited in claim 25 where the housing can be disassembled by hand without the use of tools.

27. The valve assembly as recited in claim 24 where the valve element is adapted to reciprocate in the longitudinal direction from the milking position to the cleaning position.

28. The valve assembly as recited in claim 24 where said actuator comprises a housing portion that is attached to the housing of the valve portion by quick release pins.

29. A method for cleaning an udder of a cow attached to a milking claw by employing a valve assembly in fluid communication between the milking claw and a milk supply, said valve assembly having a longitudinal axis and a transverse axis, said method comprising the steps of
   a) providing a milk supply under negative gauge pressure and providing communication between the milk supply and a second milk passage of the valve assembly,
   b) providing communication between the milking claw attached to the udder of a cow and a first milk passage,
   c) positioning a valve element of the valve assembly such that a milk channel of the valve element allows the first milk passage to be in communication with the second milk passage and further providing a relief slot between the first milk passage and a cleaning fluid passage of the valve assembly wherein the relief slot is not in communication with the cleaning fluid passage, wherein the longitudinal distance between the relief slot and the milk channel is defined as $d_{ii}$ and the longitudinal distance of the first milk conduit is defined as $d_{cc}$, where $d_{ii}$ is a greater than $d_{cc}$; and
   d) reciprocating the valve element such that a cleaning fluid channel of the valve element provides communication between the cleaning fluid passage and the first milk passage and such that the second milk passage is cutoff from communication with the first milk passage and the relief slot is in communication with the cleaning fluid, wherein the cleaning fluid is directed to the first milk passage to clean the udder of the cow and such that as the valve element is in transition from the milking position to the cleaning position, there is no fluid path between the cleaning fluid passage and the second milk passage.

30. The method as recited in claim 29 where the relief slot is located on the valve element.

31. The method as recited in claim 29 where the housing section is comprised of two plate-like members where one plate-like member forms the first milking passage and the other plate-like member forms the second milking passage.

32. The method as recited in claim 31 where the valve element is interposed between the two plate-like members and the plate-like members are connected by fastening members to provide quick disassembly.

33. The method as recited in claim 32 where the housing can be disassembled by hand without the use of tools.

34. The method as recited in claim 31 where said actuator comprises a housing portion that is attached to the housing of the valve portion by quick release pins.

35. The method as recited in claim 29 where the valve element is adapted to reciprocate in a longitudinal direction from the milking position and the cleaning position.

* * * * *